United States Patent Office 3,264,719
Patented August 9, 1966

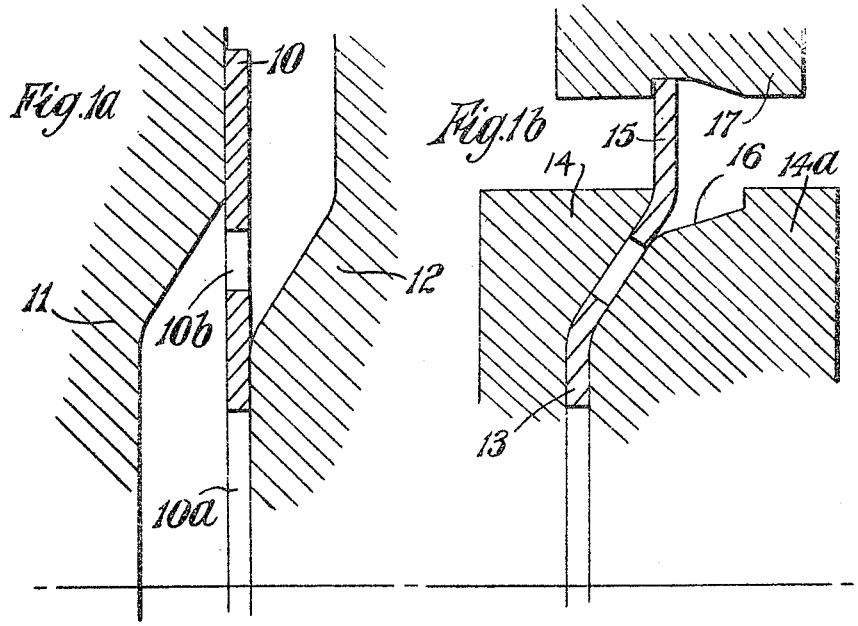
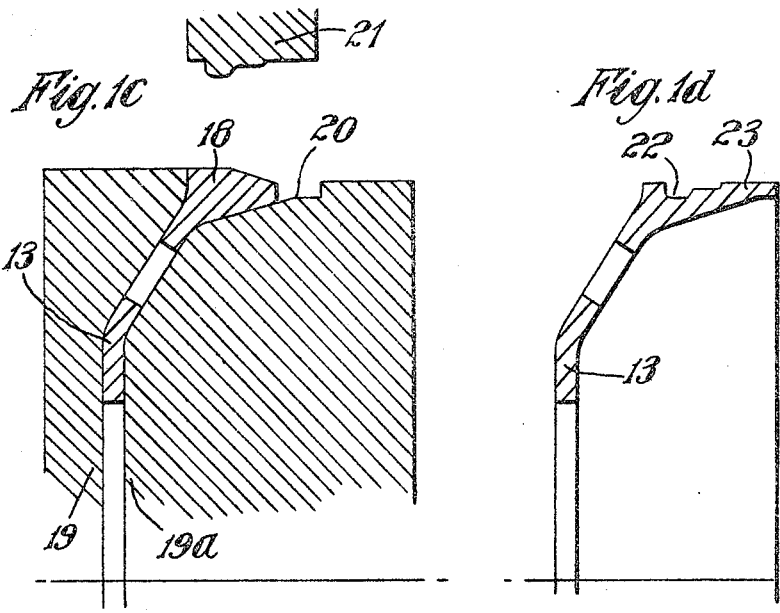

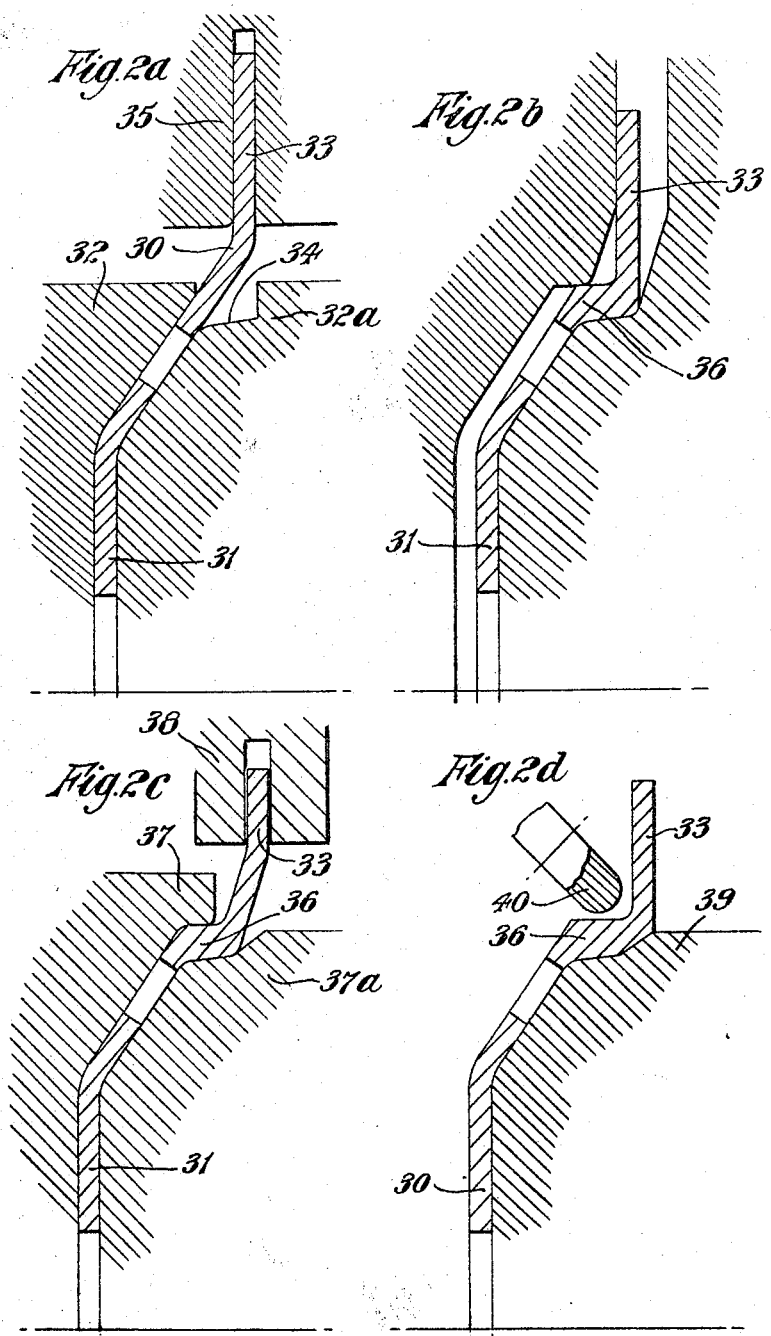

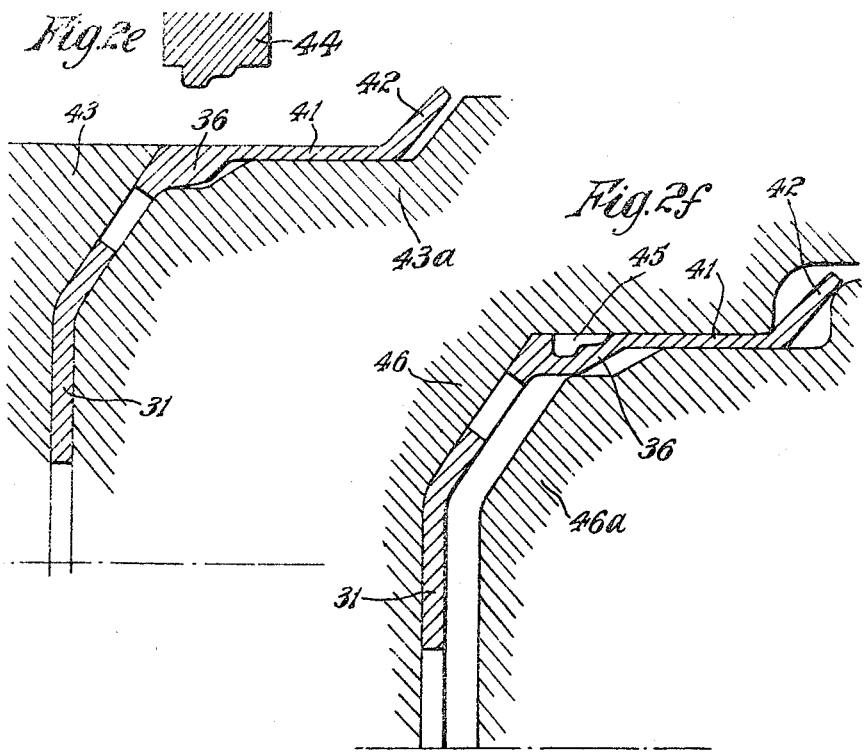
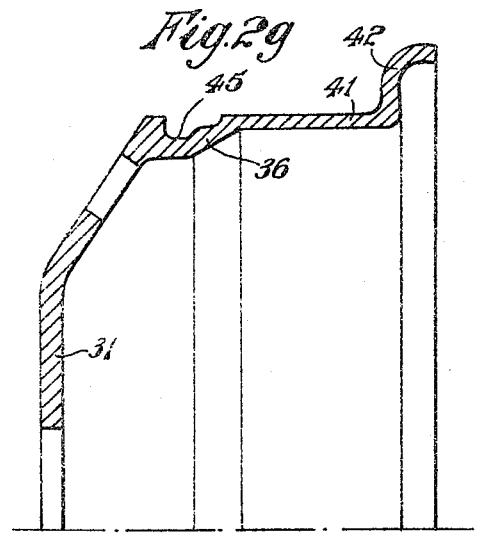

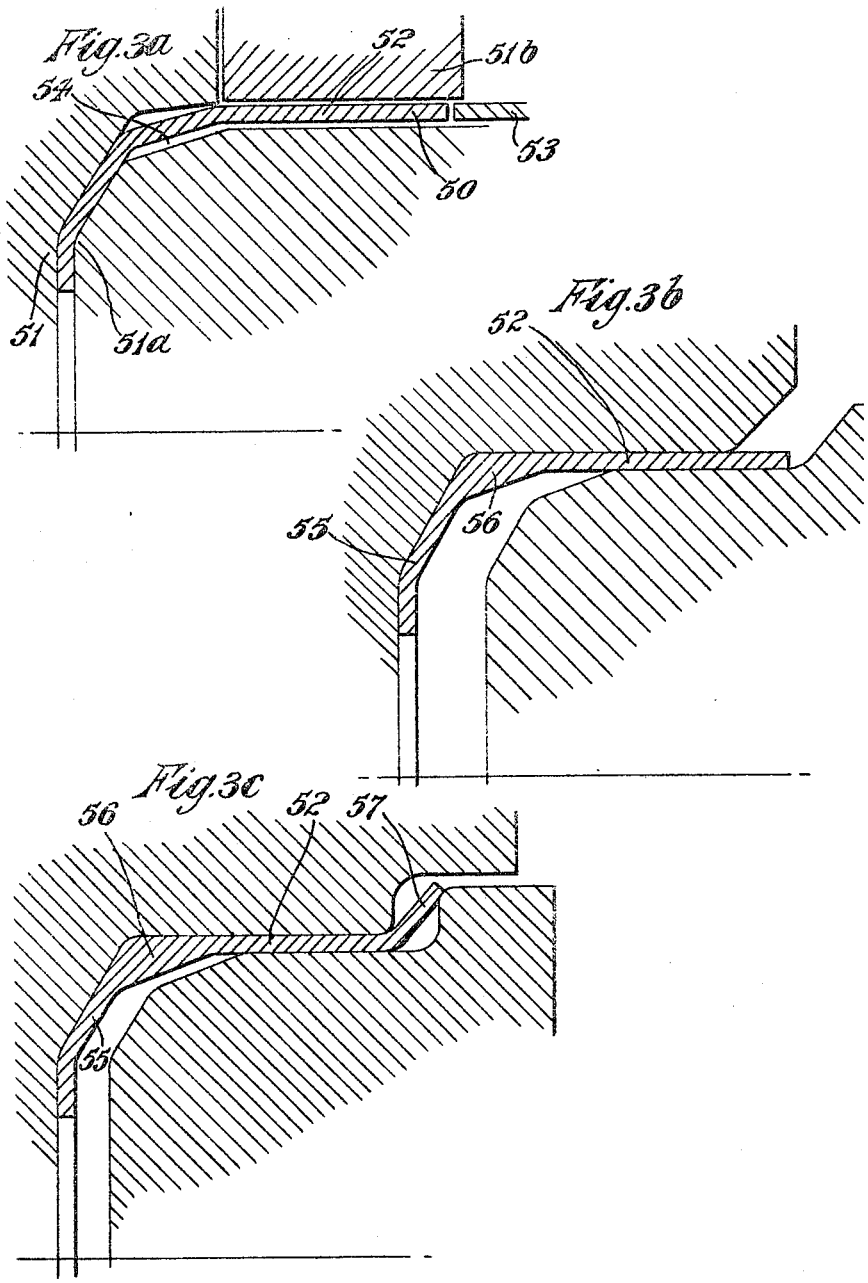

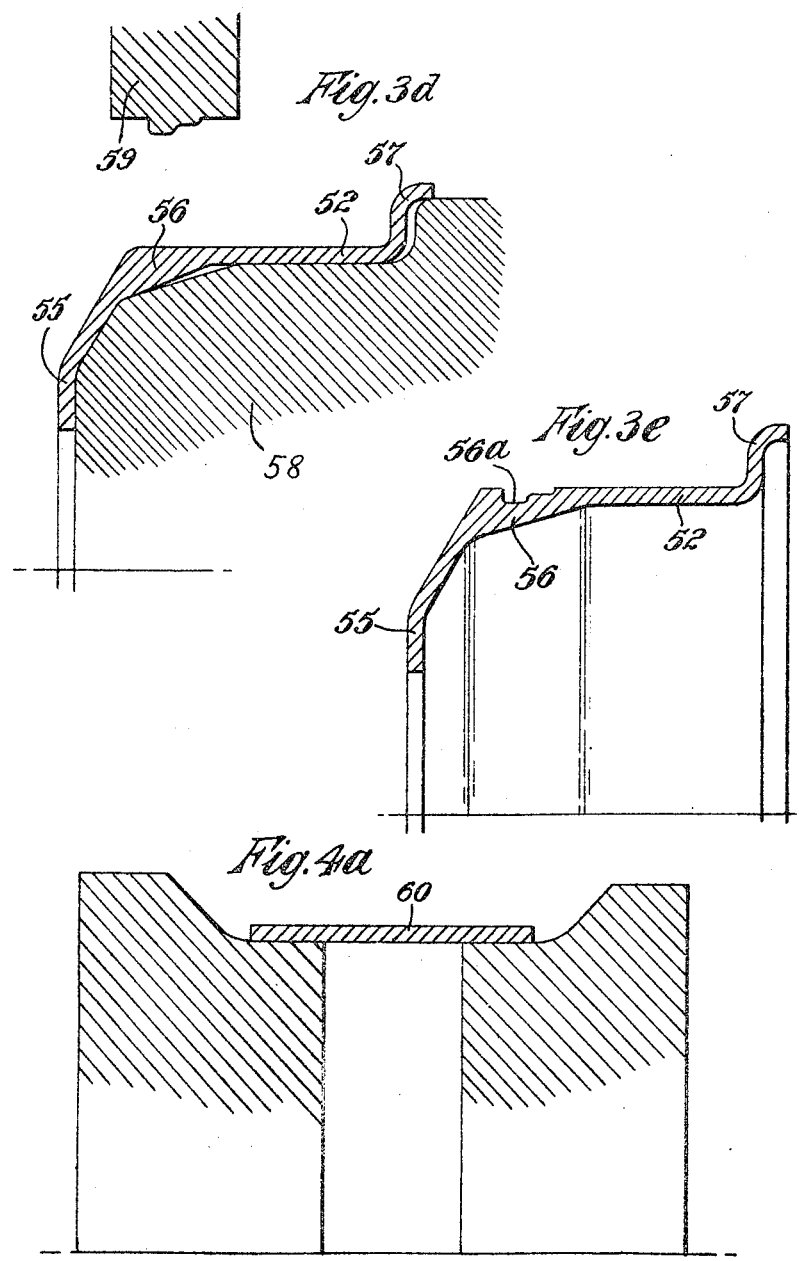

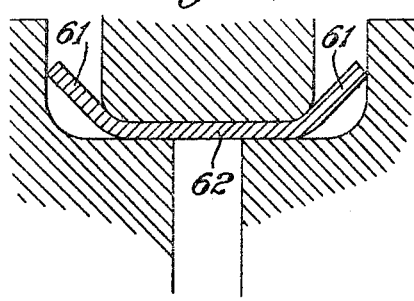
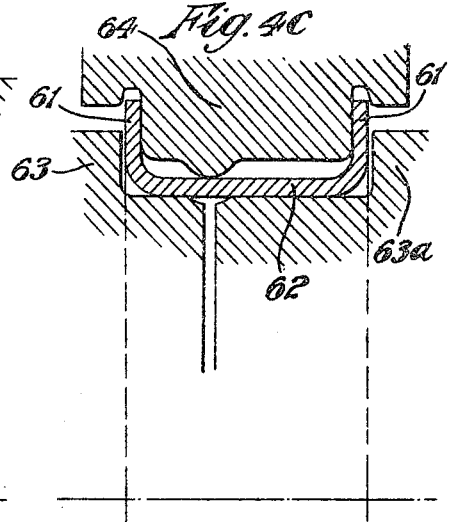
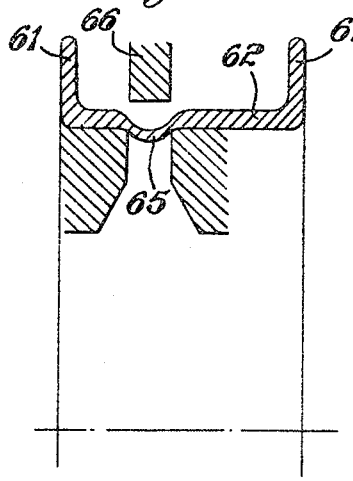
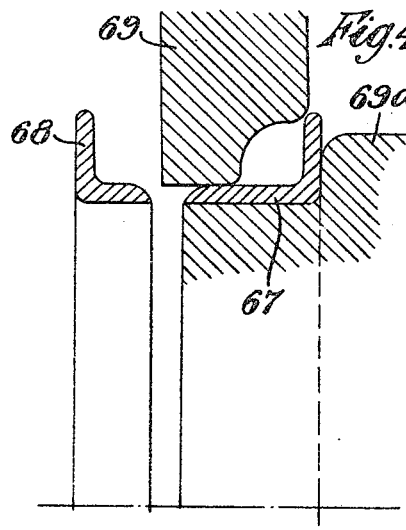

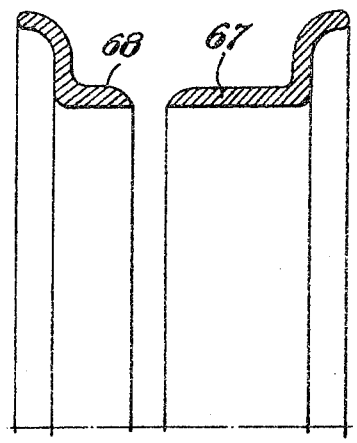
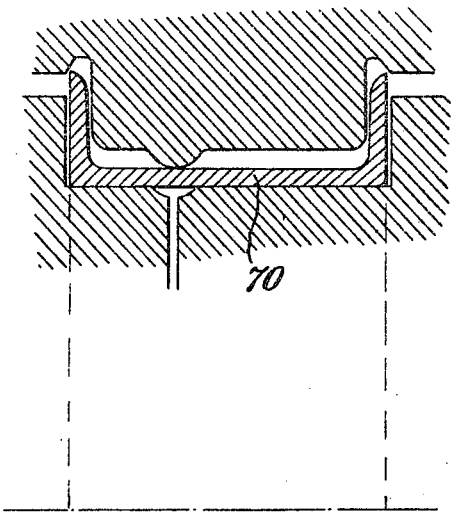
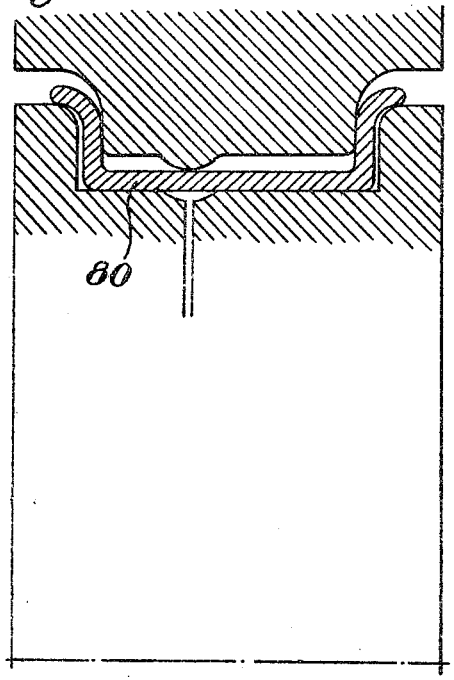

3,264,719
METHOD FOR THE MANUFACTURE OF WHEELS
George Edward Adams and George Henry Whale, Coventry, and John Harry Arthur Hanson, New Cubbington, near Leamington Spa, England, assignors to Dunlop Rubber Company Limited, London, England, a British company
Filed Nov. 15, 1962, Ser. No. 237,950
Claims priority, application Great Britain, Nov. 16, 1961, 40,985/61
4 Claims. (Cl. 29—159.01)

This invention relates to improvements in methods of manufacturing road wheels.

Two or three-piece wheels for commercial load-carrying or passenger service vehicles comprise a rim base to seat a pneumatic tyre and an annular disc attached to one edge of the rim base by e.g. welding, rivetting or other means. The rim is constructed from a length of hot rolled steel strip having a cross section which incorporates a fixed tyre retaining flange at one end thereof and a gutter at the other end. When the length is circled and the ends joined to form the rim the gutter extends circumferentially around it adjacent one edge and is then adapted to contain either a split retaining flange for a tyre in the case of a two-piece rim or a split locking ring for a flange in the case of three-piece rim. The disc which is usually dished is joined to the edge of the rim adjacent the gutter.

When a length of strip having this cross section is forced to take on a circular form with its ends abutting, the portion in between the tyre flange and the gutter generally takes on a conical form instead of a cylindrical one. This is undesirable and the rim has to undergo other operations to restore the correct diameters appropriate to the different parts of the rim.

Distortion difficulties due to welding of the abutting ends of the rim after circling and due to welding of the disc to the rim require further corrective operations to ensure that the finished wheel and in particular the gutter conform to existing commercial tolerances.

The object of the present invention is to provide an improved method of and apparatus for the manufacture of road wheels.

According to the invention a method of manufacturing a wheel having a load supporting disc portion and at least a part of a rim portion formed together as a seamless unitary structure from a single metal blank comprises the steps of mounting the blank in association with two or more shaped formers which between them define an annular channel of predetermined configuration and applying pressure to one edge of the blank to cause the metal of the latter to deform and flow into said annular channel.

Preferably the metal of the blank is heated prior to deformation to facilitate the flow into said annular channel. The formers are preferably rotatable and the pressure applied to the edge of the blank is preferably effected by a contoured roller which deforms the metal of the edge of the blank while the blank is rotated. Alternatively, the formers may be non-rotatable and pressure applied to the edge of the blank by a relatively movable punch.

The wheel may be formed from a disc-shaped blank, the radially outermost edge being deformed; alternatively the blank comprises a cup-shaped piece of metal and the formers are so placed and shaped that the annular channel is formed at the junction of the axially extending and radially extending walls, the metal of the walls being deformed by axial pressure applied at the axially outer edge. A number of formers comprising a set may be used in one process of deformation, and several sets may be used successively to give the wheel its desired final form.

In the preferred method of manufacturing a wheel the part of the rim portion terminates at a position where a second part of the rim can be joined to it by welding. The method can be applied to making the second part of the rim from a cylindrical blank by mounting it in association with one or more shaped formers which between them define an annular channel or channels of predetermined configuration and applying pressure to one or both edges of the blank to cause the metal to deform and flow into the annular channel and subsequently parting off the blank to form the second rim part. Preferably, however, the blank is formed into an annulus of U-shaped cross section having radially outwardly extending flanges, said pressure then being applied to the outer peripheral edges of the flanges and the annulus being divided along a circumferential line intermediate the flanges to produce therefrom said second rim part and also a flange suitable for use as a detachable tyre-retaining flange for said wheel.

The method can be applied in the manufacture of a wheel where a complete rim including an integral tyre-retaining flange is required to be formed together with the disc as a seamless unitary structure.

The method also includes deforming the blank so that a circumferentially extending gutter is formed in the region adjacent the location where the disc portion merges into the rim portion, the metal in said region being thickened by the step of applying pressure to an edge of the blank.

According also to the present invention apparatus for use in the manufacture of a wheel having a load-supporting disc portion and at least a part of the rim portion formed together as a seamless unitary structure from a single metal blank comprises a plurality of shaped formers defining between them an annular channel of predetermined configuration, and metal deforming means to apply pressure to an edge of a blank associated with said former to deform the metal of the blank and cause it to flow into said annular channel.

Preferably not only does the metal deforming means cause the metal to flow into said annular channel but it also imparts a profile of predetermined configuration to the outer periphery of the metal deformed thereby. The formers may be rotatably mounted, the metal deforming means comprising a roller for engaging a rotating edge of the blank, or alternatively the formers may be non-rotatable, and pressure applied to an edge of the blank by a relatively movable punch. The metal deforming means preferably comprises a roller having a predetermined shape to impart the desired profile.

Preferably also, the apparatus includes means to heat the metal which is to be deformed. The heating means may comprise high frequency electric induction heaters.

Several embodiments of the method of making a wheel according to the invention will now be described with reference to the accompanying drawings, in which:

FIGURES 1a–1d show the steps of making a disc integral with a part of a rim portion from a circular blank;

FIGURES 2a–2g show the steps of making a disc integral with a complete rim portion from a circular blank;

FIGURES 3a–3e show the steps of making a disc integral with a complete rim portion from a cup-shaped blank;

FIGURES 4a–4f show the steps of making a part of a rim portion and a detachable tyre retaining flange from a cylindrical blank;

FIGURE 5 is a drawing similar to FIGURE 4c showing a step in the production of part of a rim portion and a detachable tyre retaining flange from a hot rolled standard channel section which has been circled and the ends butt welded together.

FIGURE 6 is a drawing similar to FIGURE 4c showing a step in the production of a part rim portion and a detachable tyre-retaining flange from a special hot rolled section of suitable dimensions which has been circled and the ends butt welded.

In some of the above figures the outline of formers are shown. These are the formers which are required to produce the shape shown in the subsequent figure, according to the present method of making a wheel.

Reference will now be made to the series of FIGURES 1a–1d. A commercial vehicle wheel is made by taking a circular blank 10 of uniform thickness and punching a circular hole 10a through the centre. Brake ventilating holes 10b may be punched during the same or a subsequent operation. The blank 10 is then dished by pressing between formers 11 and 12, the outer periphery of the blank being prevented from corrugating by the use of suitable pressure plates as is well known in the art.

The dished blank is then mounted to rotate about its centre, see FIGURE 1b. The dished portion, which will eventually form the disc 13 of the wheel, is gripped between a pair of formers 14, 14a which have surfaces complementary to the side surfaces of the disc 13. The part 15 of the blank radially outwardly of the disc 13 is unsupported. The unsupported part 15 of the blank is then heated by rotating it between a pair of induction heating coils (not shown).

The formers 14 extend radially outwardly of the outermost position at which they grip the disc 13 and between them form a circumferentially extending channel 16.

While it is still hot the outer edge of the blank is subjected to pressure by a contoured roller 17 which rolls the unsupported part 15 of the blank into the channel 16 between the formers 14. The blank then has the form of a dished disc 13 surrounded at its periphery by a contoured circumferentially extending bead 18 of metal which is generally thicker than the disc 13 (see FIGURE 1c).

Subsequently the blank can be removed from between its formers 14 and positioned between a second pair of formers 19, 19a as shown in FIGURE 1c. These grip the disc 13 tightly as before but the surfaces of the formers 19, 19a may be different so that the channel 20 formed between them is elongated in an axial direction. A second contoured roller 21 is pressed against the bead 18 of metal as the blank rotates and spreads the metal of the bead into the channel 20 so that a circumferentially extending gutter 22 (see FIGURE 1d) is formed together with an axially-extending portion 23. The gutter is for the purpose of locating a locking ring or a tyre bead retaining flange (not shown). The axially-extending portion 23 comprises part of the rim and is formed together with the disc 13 as a seamless unitary structure. The completed gutter form can be obtained by combining the previously described operations in one machine only. The completion of the rim will be described at a later stage.

A wheel is made according to the series of FIGURES 2a–2g by taking a circular blank 30 of uniform thickness and punching a circular hole through the centre. Ventilating holes for the brakes of the vehicle may be punched during the same or a subsequent operation. The blank 30 is then dished by pressing, the usual precautions to prevent corrugating of the outer periphery being taken.

The dished portion shown in FIGURE 2a which will eventually form the disc 31 of the wheel is gripped between a pair of formers 32, 32a which have surfaces complementary to the side surfaces of the disc 31. The part 33 of the blank radially outwardly of the disc 31 is unsupported. The formers 32, 32a define a circumferentially extending channel 34 and when the part 33 is heated a roller 35 whose form locally contains and supports the outer region of the part 33 of the blank is moved towards the axis of rotation of the blank to apply radial pressure to the outer peripheral edge of the blank. The remainder of the part 33 is thus deformed and made to flow into the channel 34 to produce a thickened circumferentially extending portion 36 (see FIGURE 2b).

A cold pressing operation on the blank as shown at FIGURE 2b gives the shape shown at FIGURE 2c.

A second hot deforming process as previously described using the formers 37, 37a and the shaped roller 38 results in further thickening of the portion 36 at the expense of metal in the part 33 to produce the shape shown in FIGURE 2d.

The blank 30 now having the shape shown in FIGURE 2d is then mounted on the former 39 and a roller 40 is moved axially to deform the part 33 into contiguous relationship with the former 39 by cold rolling. The metal of the part 33 is attenuated during this process to form an axially extending portion 41 which terminates in a frusto conical portion 42 extending axially and radially outwardly therefrom as shown in FIGURE 2e.

A third hot deforming process, or a cold rolling process, using the formers 43, 43a and the shaped roller 44 results in a gutter 45 in the thickened portion 36 (see FIGURES 2e and 2f). Finally the portion 42 is pressed between formers 46, 46a into the shape of a tyre retaining flange, the completed wheel, less detachable flange and lock ring, being shown in FIGURE 2g.

In the alternative method shown in FIGURES 3a–3e, a cupped blank 50 (FIG. 3a) produced by conventional methods is positioned as shown in relation to the formers 51, 51a and 51b and the wall 52 is deformed by pressure exerted by an annular punch 53 on its edge. The metal in the locality of the channel 54 between the formers is heated prior to positioning the former 51 and the hot metal is deformed to fill the channel 54, the wall 52 being supported against radial movement where the metal has not been heated. Thus, as shown in FIGURE 3b the blank then comprises a disc 55, a thickened part 56 and an axially extending part 52. The tyre-retaining flange 57 is first pressed from the wall 52 to frusto-conical shape (see FIG. 3c) and is subsequently rounded by pressing (FIGURE 3d). A former 58 and a contoured roller 59 are then used as described with reference to FIGURE 1c to form the gutter 56a in the thickened part 56, as shown in FIGURE 3e.

While the method illustrated in FIGURES 3a–3e is used to produce a wheel having a rim portion the whole of which is formed as a seamless unitary structure with the disc portion, the step shown in FIGURE 3a could alternatively be employed where only part of the rim is required to be formed as a seamless unitary structure with the disc portion, as shown in FIGURE 1d.

In the series of FIGURES 4a–4f a process of making a part rim to be attached by welding to the part 23 of the integral disc and rim part shown in FIGURE 1d, and a loose tyre-retaining flange is shown. A blank 60 is formed by circling a band of even gauge hot rolled strip and joining the ends by electric butt welding. The ends of the blank are flared by conventional methods and pressed in two stages as shown in FIGURES 4b and 4c to form the flanges 61 of a channel section. The base 62 and the outside of the flanges are supported by formers 63 and 63a (FIGURE 4c) and a contoured roller 64 is brought into contact with the blank to apply pressure to the outer peripheral edges of the flanges 61 to thicken up the junctions of the flanges 61 with the base 62, and to radius the edges of the flanges. The roller 64 also produces a circumferentially extending groove 65 (see FIGURE 4d) suitably positioned for subsequent parting of the blank into a rim part 67 with a tyre-retaining flange intergal with it and a loose flange 68. The formers 63, 63a may move axially during the rolling operation. The parting operation may be carried out with punches 66 as indicated in FIGURE 4d. The final shapes of the flanges are imposed by pressing the separate parts 67 and 68 as shown in FIGURE 4e, between formers 69, 69a the final form of the parts 67, 68 being shown in FIGURE 4f.

Alternatively, a length of standard hot rolled channel section is circled and the ends are butt welded to form a blank 70 shown in FIGURE 5. The series of operations described with reference to FIGURES 4c–4f are then performed on the blank to produce a rim having a tyre-retaining flange integral with it and a loose tyre-retaining flange.

Where standard channel section is unsuitable, a special hot rolled section 80 would be required as shown in FIGURE 6. This, having the flange shape already formed, would only require to be circled and the ends butt welded. The circumferentially extending groove would have to be rolled into the special section and the annulus of channel section when split would produce a part rim portion and a detachable tyre retaining flange.

The invention is not limited to the manufacture of a wheel wherein the disc is positioned close to one edge. It may be used to form a wheel having a disc disposed in the mid-plane of the rim. In this case the disc may be formed into a double cup-shape i.e. having a portion which extends substantially axially in one direction before it turns over and extends in the opposite to form the rim portion. Alternatively the blank may be formed at its edge into two circumferentially-extending beads which may each be operated upon by the present method to produce a part of a rim, the two parts together forming a whole rim having a disc which extends in a plane passing through the rim intermediate its edges.

In all the embodiments described above, a major advantage is gained from the fact that the conventional operation of welding the disc portion to the rim portion in the relatively thick gutter region is eliminated. This operation tends to set up inaccuracies or distortions in the rim which cannot be corrected by subsequent rolling, owing to the considerable rigidity of the gutter region, whereas even in the embodiment of the invention in which a welded joint is made between two parts of the rim there is less difficulty in removing distortions since the weld is now in a thinner part of the rim, relatively remote from the rigidly supported region adjacent the disc portion.

The manufacturing tolerances can thus be reduced and the wheel will have dimensions which will conform consistently to them. For example when a 20 inch diameter wheel is rotated about its axis, the accepted standards for maximum "lift" and "wobble" is 0.125 inch. Lift is the difference between the minimum and maximum rim radii registered when the wheel is rotated a full circle. Manufacturers aim to keep these limits to about 0.070 inch, with conventional methods of building. By the present method the limit is likely to be reduced to below 0.030 inch, without resort to special operations.

The wheel made according to the present invention will be more accurately balanced than conventional wheels.

Disadvantages of wheels made by existing methods are that the existing permissible tolerances are such as to allow isolated point locations of spring flanges or lock rings in the gutter portions, which set up regions of high stress and are a source of fatigue failure in service.

The advantage derived from the closer tolerances will be reflected in the gutter dimensions where the locking ring will seal more evenly around the circumference instead of at a few isolated high spots thus making for greater safety in operation and maintenance of the wheel.

Two disadvantages due solely to the welding process on conventional wheels are overcome in the embodiment where the whole wheel is formed from a single blank. These are the need to remove welding flash by hand dressing, which occasionally arises to make the wheel round and of correct circumference after welding; and the necessity of welding the disc portion to the rim at a highly stressed location on the wheel.

The wheels made according to the present invention are suitable for tubed or tubeless tyres. In the case of a tubeless tyre a seal-retaining channel can be formed in the rim when the wheel body is made.

The grain flow of a wheel made by any of the methods described above is uninterrupted throughout the gutter region, thus providing greater strength and fatigue resistance in this region than is obtained when a welded joint is present, and leading to a stronger wheel.

In addition to the foregoing advantages a number of extra operations taking appreciable time, such as the changes in tools to accommodate dimensional variations in the hot rolled strip material supplied from rolling mills, are eliminated by the use of the methods and apparatus described above.

A further disadvantage of certain wheels, particularly where the disc portion is rivetted to the rim, is that rivets or other parts of their structure encroach on space required to accommodate the drum in the case when the drum brakes are fitted adjacent the wheel. This disadvantage is becoming increasingly critical with the tendency for vehicles to be fitted with smaller wheels and is eliminated in a wheel made by the present method.

Having now described our invention, what we claim is:
1. A method of making a disc wheel which comprises punching a circular hole through the center of a circular blank of uniform thickness, then dishing the blank by bending and pressing, then heating the circular edge margin of the blank, contour rolling said edge of the dished blank to form a contoured circumferentially extending bead which is thicker than the remaining portion of the dished blank and rolling to spread the metal of the thickened bead to form a circumferentially extending gutter and an axially extending rim portion.

2. The method of claim 1 in which ventilating holes are punched in said blank prior to dishing the blank.

3. The method of claim 1 in which a rim portion containing a bead retaining flange is welded to the edge of said axially extending rim portion.

4. The method of claim 1 in which said axially extending flange is rolled to extend it further axially and the the end margin is pressed to a bead-retaining flange.

References Cited by the Examiner

UNITED STATES PATENTS

| | | | |
|---|---|---|---|
| 329,617 | 11/1885 | Beach | 29—168 |
| 757,432 | 4/1904 | Bates | 72—82 |
| 999,085 | 7/1911 | Ball | 29—159.1 |
| 1,850,395 | 3/1932 | Hughes | 29—159.01 X |
| 1,865,185 | 6/1932 | Greenwald | 29—159.01 |
| 2,075,294 | 3/1937 | Le Jeune | 29—159.01 |
| 2,154,016 | 4/1939 | Sinclair | 29—159.3 |
| 2,736,674 | 2/1956 | Harmon | 29—159.01 |

FOREIGN PATENTS 823,135  11/1951  Germany.

JOHN F. CAMPBELL, Primary Examiner.

WHITMORE A. WILTZ, Examiner.

THOMAS H. EAGER, Assistant Examiner.